US008645610B2

(12) United States Patent
Chang et al.

(10) Patent No.: US 8,645,610 B2
(45) Date of Patent: Feb. 4, 2014

(54) ORGANIZING AND MANAGING A MEMORY BLADE WITH SUPER PAGES AND BUFFERS

(75) Inventors: Jichuan Chang, Mountain View, CA (US); Kevin Lim, Ann Arbor, MI (US); Partha Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 13/257,271

(22) PCT Filed: Jun. 29, 2009

(86) PCT No.: PCT/US2009/049041
§ 371 (c)(1),
(2), (4) Date: Sep. 16, 2011

(87) PCT Pub. No.: WO2011/002438
PCT Pub. Date: Jan. 6, 2011

(65) Prior Publication Data
US 2012/0005556 A1    Jan. 5, 2012

(51) Int. Cl.
*G06F 12/00* (2006.01)
(52) U.S. Cl.
USPC ............................................ 711/5; 711/202
(58) Field of Classification Search
None
See application file for complete search history.

(56) References Cited

U.S. PATENT DOCUMENTS

| 7,096,306 B2 | 8/2006 | Riley |
| 2005/0108496 A1 | 5/2005 | Elnozahy et al. |

OTHER PUBLICATIONS

Huang et al., "Page-Mapping Techniques for CC-NUMA Multiprocessors", © 1997 IEEE. p. 91-104.*
ltshak et al., "AMSQM: Adaptive Multiple Super-Page Queue Management", © 2008 IEEE, p. 52-57.*
Falsafi, et al, 'Appiication-Specific Protocols for User-Level Shared Memory,' In: Proceedings of Supercomputing '94. IEEE, 1994, pp. 380-389.
International Search Report and Written Opinion received in PCT Application No. PCT/US2009/049041, mailed Dec. 31, 2009, pp. 11.
Lim, et al, "Disaggregated Memory for Expansion and Sharing in Blade Servers." In: 36th International Symposium on Computer Architecture. ACM, 2009, ISBN 978-1-60558-526-0, pp. 267-278.

\* cited by examiner

*Primary Examiner* — Brian Peugh

(57) ABSTRACT

A system and method is illustrated wherein a protocol agent module receives a memory request encoded with a protocol, the memory request identifying an address location in a memory module managed by a buffer. Additionally, the system and method includes a memory controller to process the memory request to identify the buffer that manages the address location in the memory module. Further, the system and method includes an address mapping module to process the memory request to identify at least one super page associated with the memory module, the at least one super page associated with the address location.

15 Claims, 18 Drawing Sheets

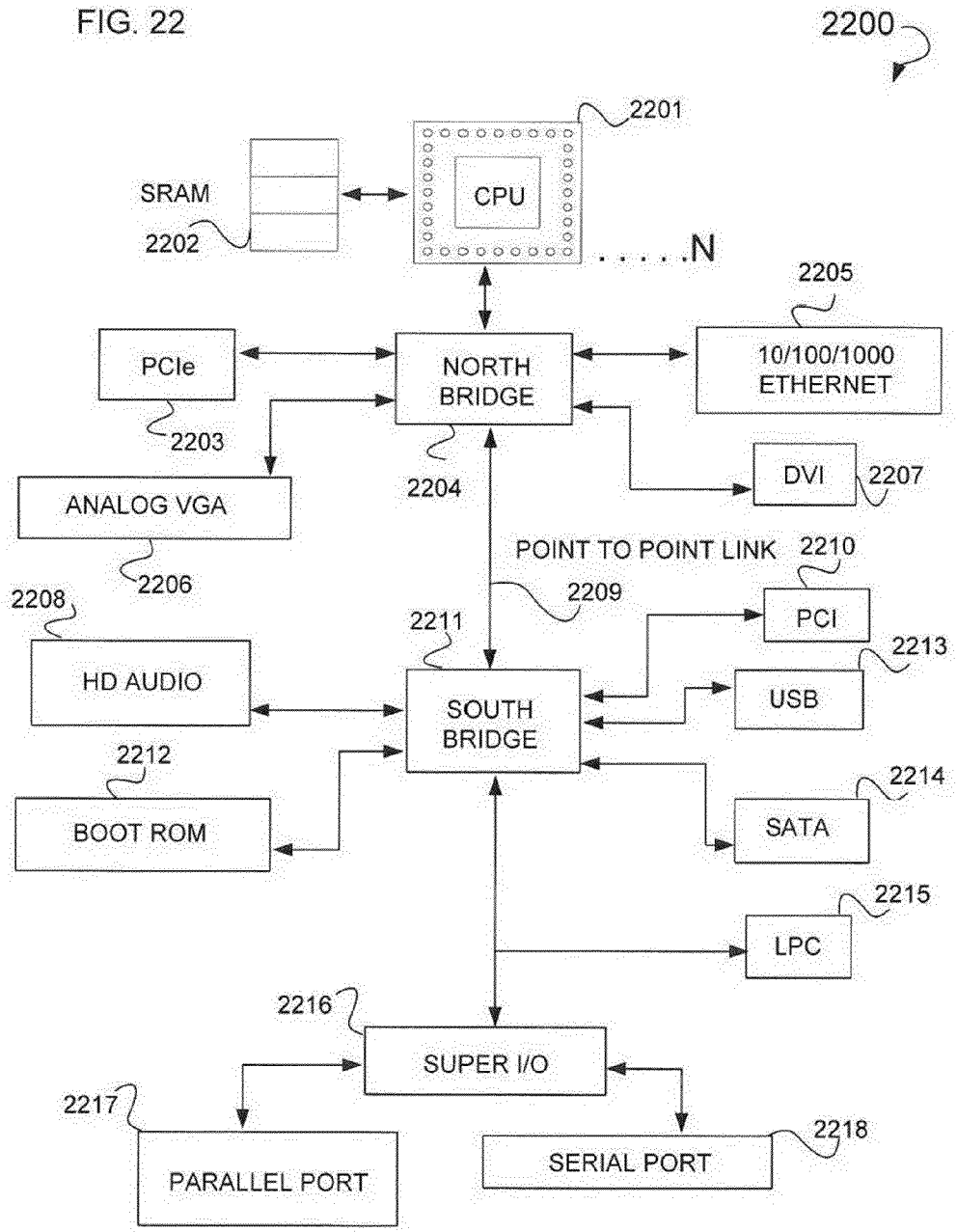

ORGANIZING AND MANAGING A MEMORY BLADE WITH SUPER PAGES AND BUFFERS

CROSS REFERENCE TO RELATED APPLICATIONS

This is non-provisional patent application is related to Patent Cooperation Treaty Application Number PCT/US2008/069168 entitled "MEMORY SERVER" that was filed on Jul. 3, 2008, and which is incorporated by reference in its entirety.

BACKGROUND

Repeater buffers are used in the facilitation of data reads and writes from memory. Additionally, these repeater buffers are dedicated to the management a particular type of memory. Further, repeater buffers are used by computer systems in the management of virtual memory to conduct the above referenced reads and writes.

BRIEF DESCRIPTION OF THE DRAWINGS

Some embodiments of the invention are described, by way of example, with respect to the following figures:

FIG. 22 shows a diagrammatic representation of a machine, according to an example embodiment, in the form of a computer system within which a set of instructions for causing the machine to perform any one or more of the methodologies discussed herein.

DETAILED DESCRIPTION

A system and method is illustrated for facilitating memory management of a plurality of disparate memory devices using one or more repeater buffers. These repeater buffers, referenced herein as buffers, reside upon a memory blade. Memory management includes the allocation or de-allocation of virtual memory pages utilized by compute blades. Virtual memory pages, as referenced herein, include super pages comprised of sub pages. A memory blade is a device for managing a plurality of memory devices that may be utilized by a compute blade. A compute blade, as referenced herein, is a computer system with memory to read input commands and data, and a processor to perform commands manipulating that data. Example memory devices, referenced herein as memory modules, include Static Random Access Memory (SRAM), Dynamic Random Access Memory (DRAM), Electrically Erasable Programmable Read-Only Memory (EEPROM) referenced herein as flash memory, other Main Memory implementation (e.g., magnetic, flash or optically based memory), or other suitable memory. A buffer, as used herein, is a device used to temporarily store and process (e.g., encode and decode) data for storage into one or more of the memory devices.

In some example embodiments, the virtual memory pages are managed using a system of mapped addresses. For example, a blade identifier (bladeID) and System Machine Address (SMA) are used by the memory blade to map to a Remote Memory Machine Address (RMMA). Specifically, a map register is indexed using the bladeID, where each entry in the map register (e.g., a base entry and a limit entry) represents the number of super pages managed by the memory blade identified using the bladeID. Further, the base entry and a super page ID parsed from the SMA are used to index into an RMMA map structure. Each entry in the RMMA map represents a super page and the permissions associated with this super page. A super page is a virtual memory page of for example, 16 KB or larger. A sub page is a virtual memory page that is, for example, smaller than 16 KB.

In some example embodiments, a system and method is illustrated for a memory blade design that provides a unified command interface (e.g., Application Programming Interfaces (APIs)) for multiple access granularities and usage models, and using memory modules with heterogeneous density and timing characteristics, and modular composition of multiple memory blades. The API facilitates read and write functionality for the memory blade. Additionally, the API allows for memory on the memory blade to be allocated or de-allocated by a compute blade. Additionally, the API allows for address mappings and permissions to be retrieved and set. This API also allows a single memory blade to be shared by multiple compute blades.

Figure 1:
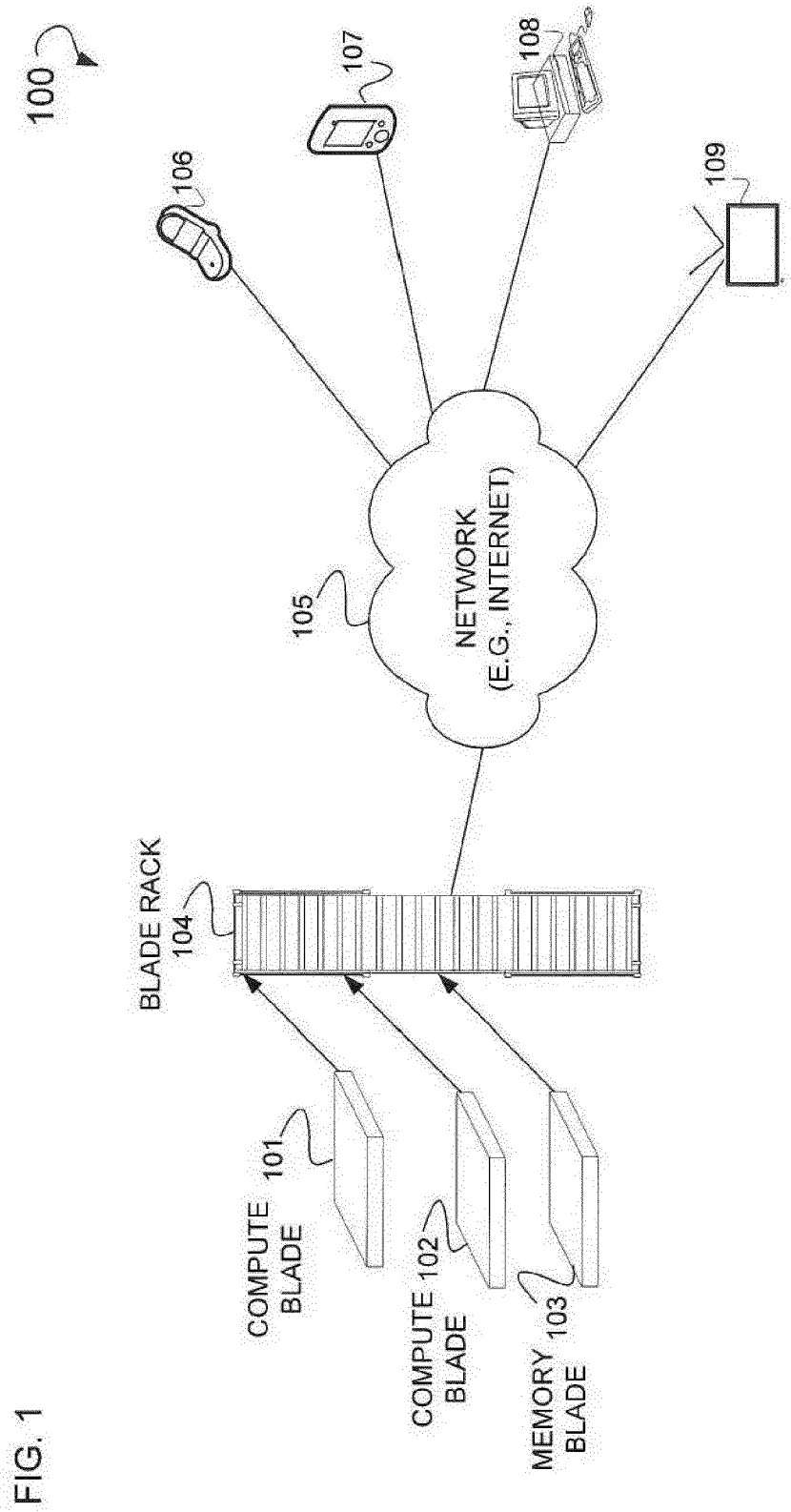
FIG. 1 is a diagram of a system, according to an example embodiment, illustrating the use of a memory blade in conjunction with one or more compute blades in a network environment.

FIG. 1 is a diagram of an example system 100 illustrating the use of a memory blade in conjunction with one or more compute blades in a network environment. Shown are a compute blade 101, a compute blade 102, and a memory blade 103 each of which is positioned proximate to a blade rack 104. The compute blades 101 through 102 are operatively connected to the network 105 via a logical or physical connection. Operatively connected, as used herein, is a logical or physical connection. The network 105 may be an internet, an intranet, a Wide Area Network (WAN), a Local Area Network (LAN), or some other network and suitable topology associated with the network. In some example embodiments, operatively connected to the network 105 is a plurality of devices including a cell phone 106, a Personal Digital Assistant (PDA) 107, a computer system 108 and a television or monitor 109. In some example embodiments, the compute blades 101 through 102 communicate with the plurality of devices via the network 105.

Figure 2:
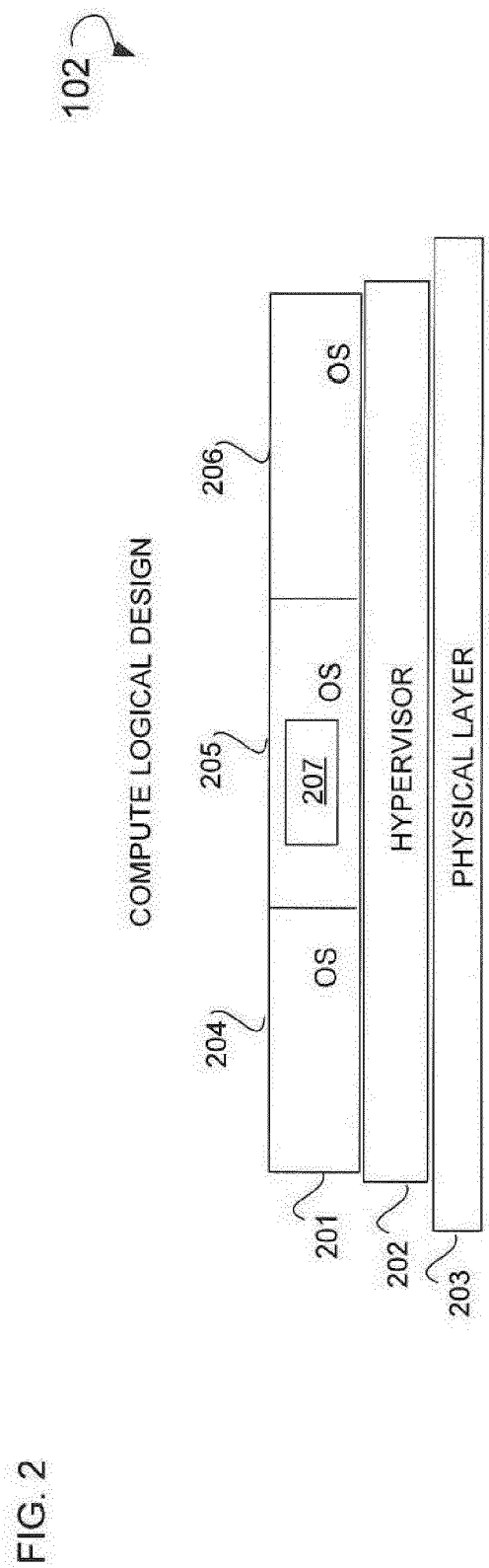
FIG. 2 is a diagram illustrating a logical design of a compute blade, according to an example embodiment, that implements a balloon driver.

FIG. 2 is a diagram illustrating an example logical design of the compute blade 102 that implements a balloon driver. Illustrated is an operating system layer 201 that resides upon a hypervisor 202, which, in turn, resides upon a physical layer 203. The operating system layer 201 includes one or more operating systems acting as Virtual Machines (VMs). These VMs may be implemented using any one of a number of virtualization schemes including Full Virtualization, Hardware-Assisted Virtualization, Partial Virtualization, Paravirtualization, and Operating System-Level Virtualization. Suitable operating systems include, for example, the LINUX™ operating system, Microsoft Corporation's WINDOWS™ operating system, Sun Corporation's SOLARIS™ operating system, the UNIX™ operating system, or some other suitable operating system known in the art. The hypervisor 202 may be configured as a Type 1, Type 2, or Hybrid-Type hypervisor. The physical layer 203 may be a computer system. A balloon driver 207 is included as part of this operating system 205. In some example embodiments, the balloon driver 207 is used to allocate and de-allocate virtual memory for the operating system 205. This allocation and de-allocation is performed transparently for the operating system 205 by the balloon driver 207 working in conjunction with the hypervisor 202.

Figure 3:
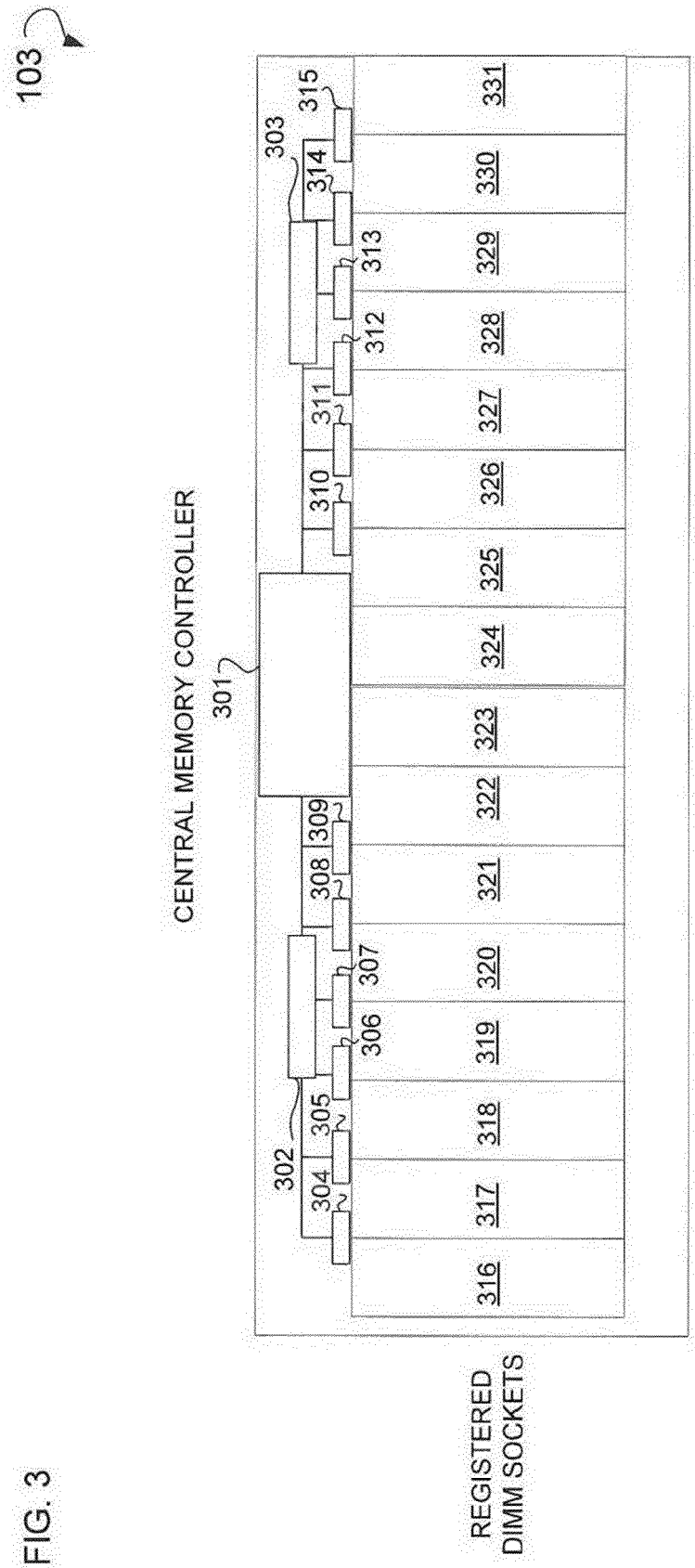
FIG. 3 is a diagram of a physical design of the memory blade, according to an example embodiment.

FIG. 3 is a diagram of an example physical design of the memory blade 103. Illustrated is a plurality of the central memory controllers that manage a plurality of buffers. These buffers, in turn, manage or control a plurality of additional buffers, or DIMM sockets. The central memory controller, buffers, and DIMM sockets are operatively connected via a plurality of memory channels. Shown is a central memory controller 301 that is operatively connected to the buffer 302 and the buffer 303. The buffer 302, in turn, is operatively connected to buffers 305 through 309. Buffer 303 is operatively connected to buffers 310 through 315 via a memory channel. The buffer 302 manages the buffers 304 through 309, while the buffer 303 manages the buffers 310 through 315. In some example embodiments, the various buffers (e.g., 304 through 309 and 310 through 315) are combined into one single logical buffer. Further, illustrated are DIMM sockets 316 through 317 that include physical memory managed by the buffer 304. Moreover, the DIMM sockets 317 and 318 are managed by the buffer 305. DIMM sockets 318 through 319 are managed by the buffer 306. Sockets 319 through 320 are managed by buffer 307. DIMM sockets 320 through 221 are managed by buffer 308. DIMM sockets 321 through 223 are managed by buffer 309. In example cases where overlap exists between buffers controlling particular memory residing within a particular DIMM sockets, this memory may be partitioned between the overlapping buffers. Also illustrated, are DIMM sockets 324 through 326 than are managed by buffer 310. DIMM sockets 326 through 327 are managed by buffer 311. DIMM sockets 327 through 328 are managed by buffer 312. DIMM sockets 328 through 329 are managed by buffer 313. DIMM sockets 329 through 330 are managed by buffer 314. DIMM sockets 330 through 331 are managed item by buffer 315. The memory residing as a part of these various DIMM sockets may be DRAM memory, flash based memory, or some other suitable type of physical memory. In some example embodiments, the memory blade 103, represented as a half-height memory blade, can support thirty-two Double Data Rate (DDR) ⅔ memory modules.

In some example embodiments, multiple on-board repeater buffers 304 through 315 are implemented with each buffer acting as an independent memory controller, or manager, for a subset of the memory modules. As illustrated in FIG. 3, a single buffer may be used to manage 2-4 memory modules. The management duties for a buffer (e.g., buffers 304 through 315) include receiving memory operation commands and data from a central memory controller (e.g., central memory controller 301), and forwarding the data to individual memory modules (e.g., memory modules 316 through 331). Responses are sent from one more of the memory modules 316 through 331, via the buffers 304 through 315, to the central memory controller 301. Additionally, as will be more fully illustrated below, a buffer may store and use a particular codec to format data for storage in a particular memory module to which the buffer is operatively connected.

Figure 4:
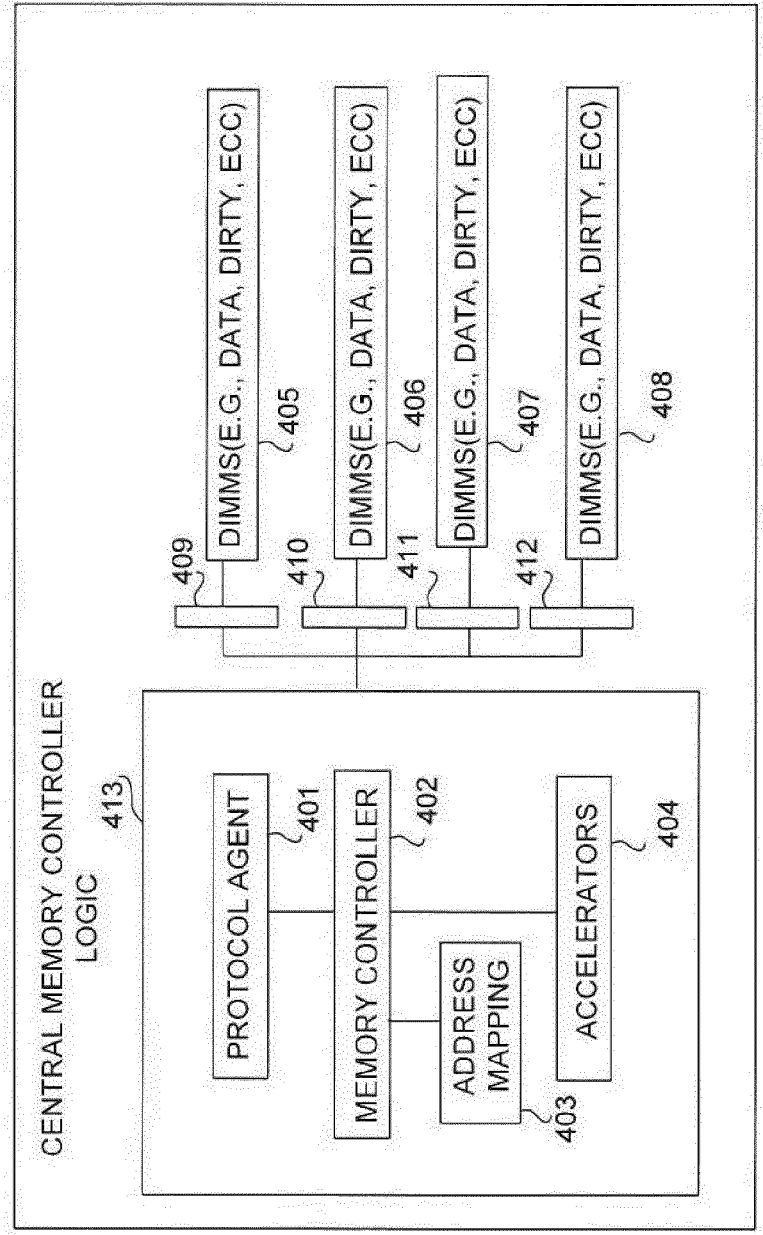
FIG. 4 is a diagram of a memory blade logical design, according to an example embodiment, illustrating the various logic modules that are included in a memory blade.

FIG. 4 is a diagram of an example memory blade logical design 103 illustrating the various logic modules that are included in the memory blade 103. Shown is the central memory controller 301, represented at 413, as four sub modules. A protocol agent 401 is shown that communicates with the compute blades (e.g., compute blades 101 and 102). This communication may be via some type of protocol including Peripheral Component Interconnect Express (PCIe), HYPERTRANSPORT™, QUICKPATH INTERCONNECT™ (QPI), or some other suitable protocol. Further, this communication includes the packing/unpacking of requests and responses using the aforementioned protocols. Request that cannot be satisfied directly by the memory blade are forwarded to other memory blades or compute blades. A requested forwarded to other memory blades is referenced herein as a memory-side request. A memory controller 402 is illustrated that handles read or write requests. In some example embodiments, these read and write requests are data pairs that include a bladeID, and a compute blade machine address (e.g., the SMA). An address mapping module 403 is implemented to locate the physical location of the data (denoted as an RMMA) on the memory blade as well as check whether the read and write requests have the appropriate permissions. Where the appropriate permission exists, a requested access is permitted and an RMMA is retrieved by the address mapping module 403. The RMMA is forwarded by the memory controller 402 to the corresponding repeater buffer via a memory channel. The buffer responds to this request through performing the necessary encoding and decoding operation for the memory module upon which the target data is located. An accelerator module 404 is illustrated that can be implemented either within a memory controller, or proximate to the controller, or a repeater buffers to do special purpose computation on the data. This accelerator can be a CPU, special purpose processor, Application-Specific Integrated Circuit (ASIC), or a Field-Programmable Gate Array (FPGA). Special purpose computation includes the execution of hashing algorithms (e.g., the Secure Hashing Algorithm (SHA)), compression/decompression algorithms, encryption/decryption algorithms (e.g., the Advanced Encryption Standard (AES)), or Error Correction Coding (ECC)/chipkill coding. The buffers may be implemented to hide the density/timing/control, etc. and/or the operational details of a memory module from the central memory controller. Further, a buffer may be used to independently operate other buffers in the case of the failure of another buffer. Various DIMMs 405 through 408 are also shown, where these DIMMs are memory modules.

Figure 5:
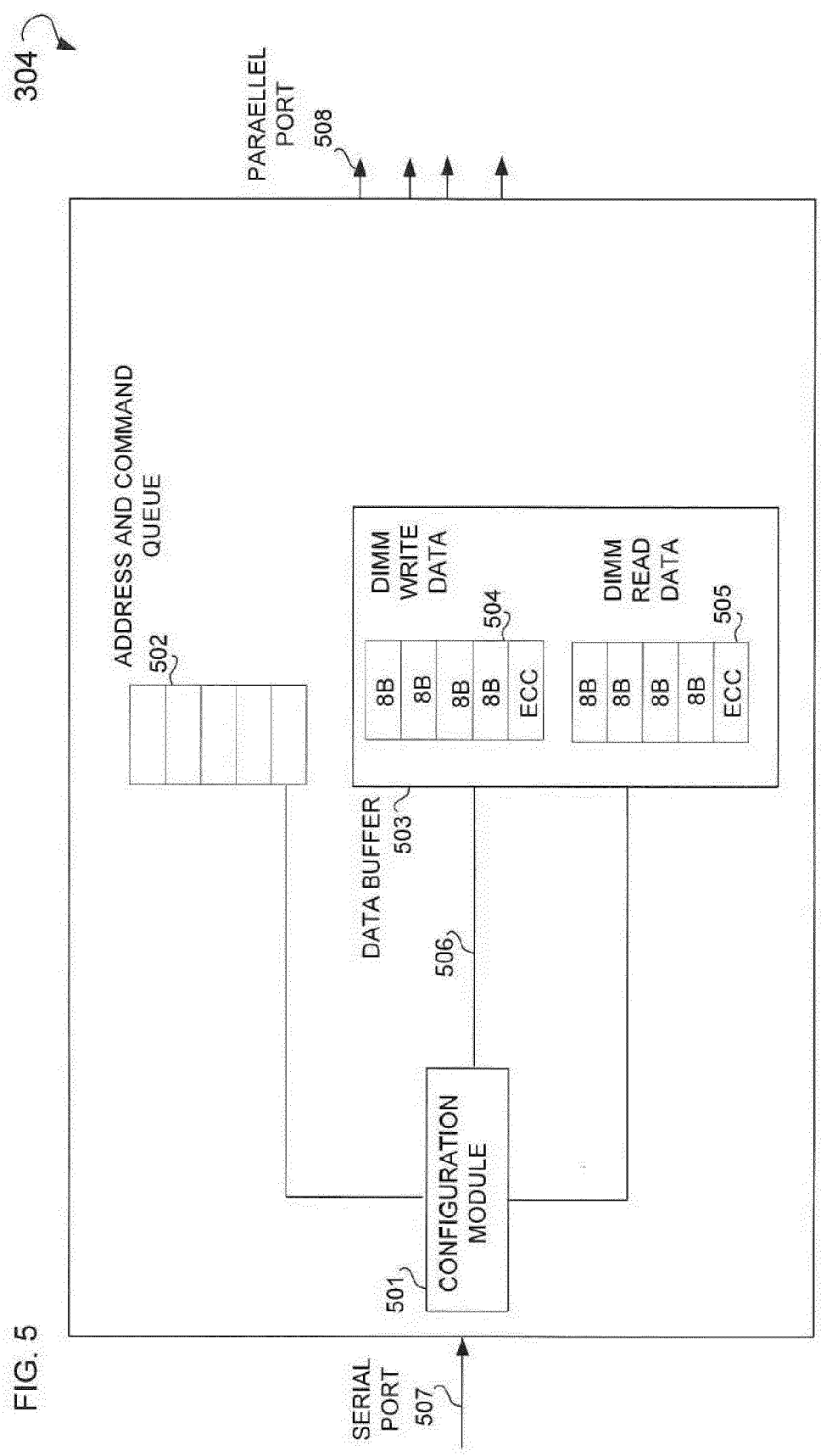
FIG. 5 is a diagram of a buffer, according to an example embodiment.

FIG. 5 is a diagram of an example buffer 304. Shown is a configuration module 501 that has an interface to a memory channel via either a serial link 507 or the parallel memory channel. This configuration module 501 may be implemented in hardware, software, or firmware. Included in this configuration module 501 are one or more configuration registers. These registers include data to configure one or more DIMM memory modules, codecs for formatting data for the DIMM memory modules, timing values (e.g., memory timing parameters such as CL, tRCD, tRP, and tRAS), or reliability configuration values (e.g., RAID0). Operatively connected, via a bus 506, to the configuration module 501 is an address and command queue 502, and data buffer 503. The address and command queue 502 includes, for example, outstanding memory commands (e.g., both request type and address) to the DIMM memory modules. Free space may be free physical space, or virtual memory pages. The data buffer includes a DIMM write data buffer, and a DIMM read data buffer. Both the DIMM write and read buffers include memory location information for the various DIMMs serviced by the buffer 304. Additionally, a parallel port 508 is shown that allows for the transmission of a data (e.g., read and write data) along a memory channel to a memory module.

Figure 6:
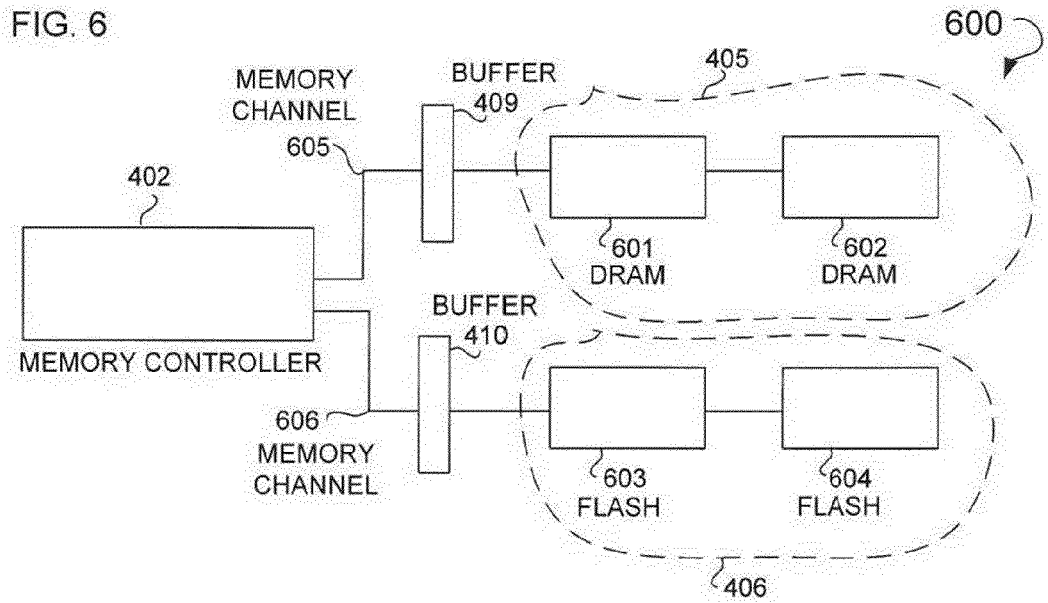
FIG. 6 is a diagram of a system, according to an example embodiment, illustrating the relationship between a memory controller, buffer, and Dual In-line Memory Module (DIMM) memory modules.

FIG. 6 is a diagram of an example system 600 and illustrating the relationship between a memory controller, buffer, and DIMM memory modules. Shown is the memory controller 402 that operatively connected to the buffers 409 and 410 via memory channels 605 and 606. In some example embodiments, the memory channel 605 and 606 are serial, point to point links. This figure shows an implementation that supports different types of physical memory (e.g., DRAM and flash). The buffer 409 is, in turn, operatively connected to a DIMM memory module in the form of DRAM 601 and DRAM 602. Collectively, these memory modules 601 and 602 form memory module 405. Further, buffer 410 is operatively connected to a memory module in the form of flash memory 603 and flash memory 604 via the memory channel 606. Collectively, these memory modules are referenced herein as memory modules 406.

Figure 7:
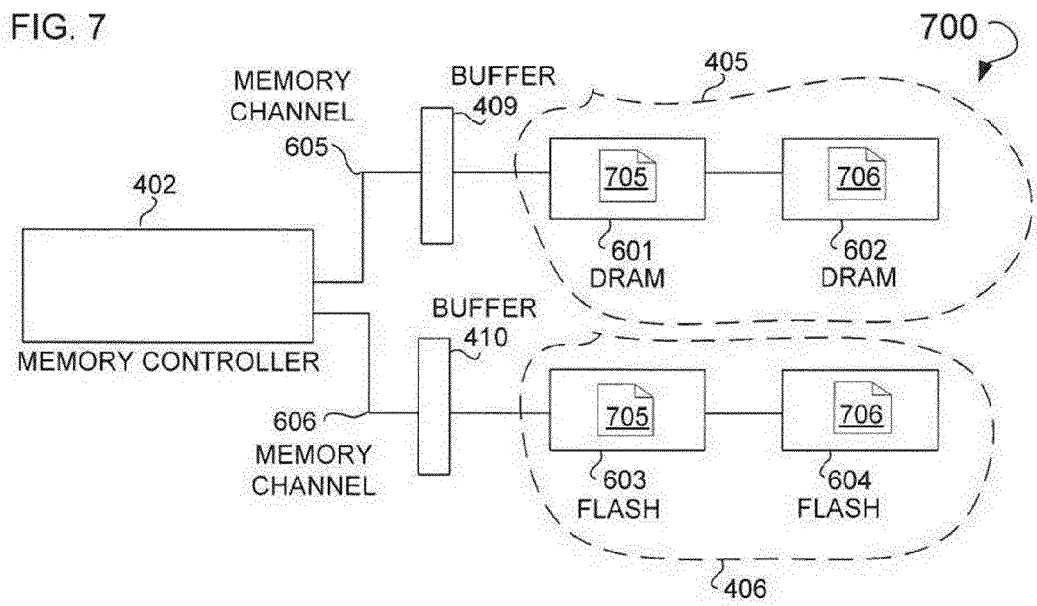
FIG. 7 is a diagram of a buffer system, according to an example embodiment, implementing a memory Redundant Array of Inexpensive Disk (RAID) system.

FIG. 7 is a diagram of an example buffer system 700 implementing a RAID system. In some example embodiments, memory mirroring and a memory RAID system can be implemented between modules managed by the same or different buffers. Further, this RAID system can be implemented between modules sitting on two different memory blades. Illustrated are a virtual memory page 705 that resides on the DRAM 601, and a virtual memory page 706 that resides upon the DRAM 602. Using a RAID system and method, the virtual memory page 705 is written to the flash memory 603. This writing of virtual memory page 705 to flash 603 is performed contemporaneously with the writing of the virtual memory page 705 to DRAM 601. Further, the virtual memory page 706 is written to the flash memory 604 contemporaneously with the writing of virtual memory page 706 to the DRAM 602. Through the use of a RAID system, memory redundancy is preserved and can recover from failures in any single memory module.

In some example embodiments, various reliability and serviceability optimizations are implemented for the buffers. For example, in cases where the memory blade 103 maintains a free list of super pages, memory scrubbing can be initiated for allocated virtual memory pages in the background to avoid unnecessary failures. Scrubbing, as referenced herein, includes the detection and recovery of virtual memory pages that include data errors. Further, because memory allocation information is maintained on the memory blade 103, the memory module 103 can map out memory modules (e.g., DRAM 601) for which a fault is detected, and use memory modules for which a fault has not been detected. Additionally, memory provisioning, repair and upgrade can be done on a single memory blade, without having to modify individual compute blades. Further, the buffer 409 and 410 can also include an indicator Light Emitting Diode (LED) light to indicate the operational status of these memory modules.

Figure 8:
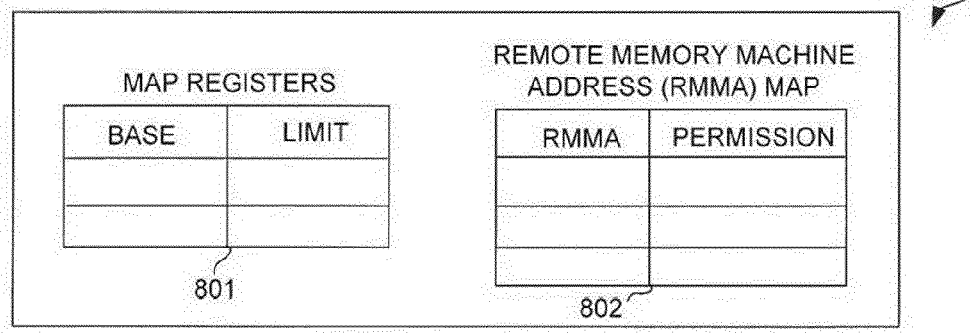
FIG. 8 is a diagram of an address mapping module, according to an example embodiment

FIG. 8 is a diagram of an example address mapping module 403. Shown are a map register table 801 and a remote RMMA map table 802. As will be more fully illustrated below, the map register table 801 includes an entry that denotes the number of super pages managed by a memory blade, as denoted by the difference between the base entry value and the limit entry value. The base entry value is a numeric value indexed into using the bladeID. An RMMA map table 802 includes an array of RMMA entries and permission entries. The RMMA super page entry is a numeric value representing a super page address. The permissions entry is a permission value (e.g., a bit, Boolean, char, or other suitable value) denoting the permissions for a particular RMMA super page entry in terms access and management permissions. Using the super page address and the limit entry value, the RMMA map structure may be traversed and the permissions for each super page managed by a memory blade identified using the bladeID determined.

Figure 9:
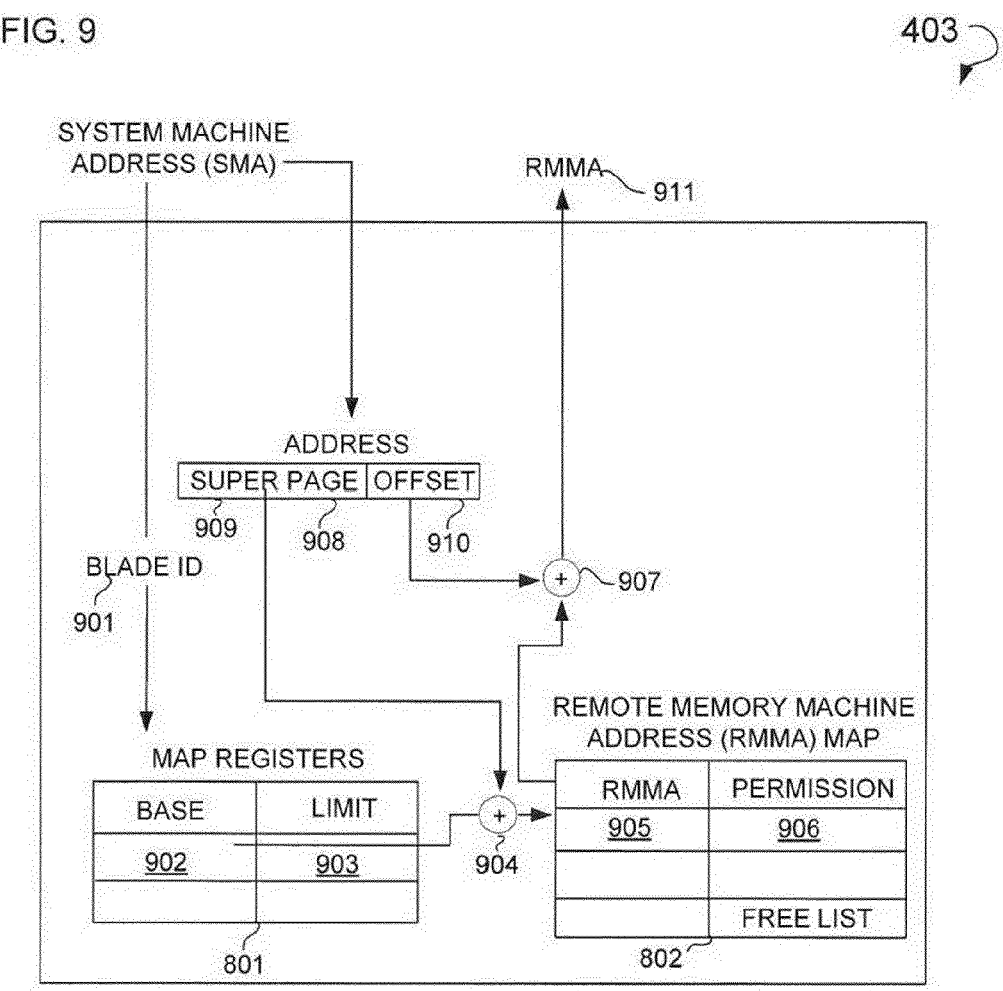
FIG. 9 is a diagram illustrating a call sequence, according to an example embodiment, for the address mapping module to engage in a read or write operation.

FIG. 9 is a diagram illustrating an example call sequence for the address mapping module 403 to engage in a read or write operation. Shown is an SMA that is received and parsed to look up the RMMA. A portion of the SMA is parsed into a blade ID 901, and an address 909. The bladeID 901 is used to index into the map register table 801 to determine the difference between the base entry value and the limit entry value so as define the number of super pages associated with the identified memory blade. In some example cases, the address 909 is manipulated using modular arithmetic or bit shifting to retrieve a super page address 908 from the SMA. An offset value 910 is also retrieved from the address 909 and combined with the RMMA, via operation 907, to generate the RMMA 911. In some example embodiments, the RMA 911 is a position of a super page or sub page managed by a memory blade that is capable of being read or written to by the memory blade. An operation 904 is executed that combines the base entry value 902 and the super page address 908 to index into the RMMA map table 802. Where the appropriate permission exists to do so (see e.g., permission 906) an RMMA value 905 is retrieved. The RMMA value 905 is a super page base address. Also shown as part of the RMMA map table 802 is a list of free virtual memory pages that can be allocated when a device or blade requests for more capacity on the memory blade.

In some example embodiments, the call sequence for the various tables maintained by the address mapping module 403 is illustrated as follows. Accessing data on the remote memory involves address mapping, and performing a read or write to a memory blade and memory maintained therein. In one example embodiment, memory is organized and managed in large chunks (e.g., as a plurality of 16 MB super pages) so that one single entry in the RMMA mapping table 802 corresponds to thousands of contiguous operating system pages (e.g., virtual memory pages). These virtual memory pages are accessed based upon the needs of the compute blades and the applications residing therein.

Some example embodiment include the use of the above referenced map registers 801 to facilitate RMMA partitioning to identify particular compute blades that are to receive a memory allocation, or that are to have memory de-allocated. An RMMA may be partitioned in a particular manner to enforce a static or dynamic memory allocation. Under a static partitioning regime, each compute blade is assigned a fixed portion of remote memory. This remote memory is allocated at startup time, and remains constant during the compute blade's uptime. Under a dynamic partitioning regime, each compute blade is given an initial allocation of remote memory, and can request additional memory as application demand changes. In some example embodiments, the memory blade 103 orchestrates memory reallocation by revoking allocations from some compute blades (e.g., compute blade 102) to provide capacity to others (e.g., compute blade 101). Such changes are recorded as the map register values to reflect the capacity allocation for each compute blade.

In certain cases, RMMA sharing may be implemented by a compute blade. An owner of a RMMA region is defined as the compute blade to which the RMMA region is allocated. This owner can choose to map the RMMA into another blade's SMA, therefore allowing the data stored in this region to be shared among both blades (e.g., compute blade 101 and 102). This is achieved by the mapping and sharing interface illustrated below.

Figure 10:
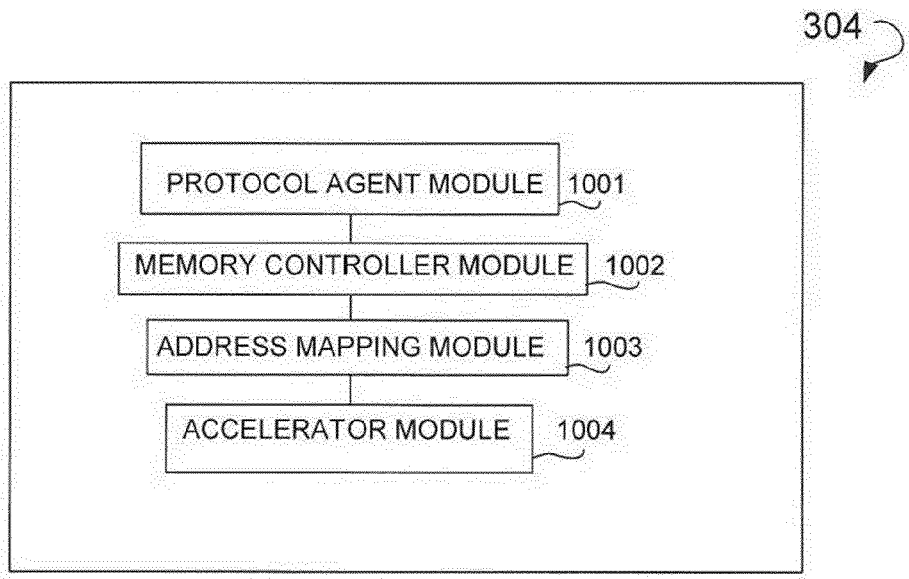
FIG. 10 is a block diagram cola computer system, according to an example embodiment, in the form of the memory blade used to retrieve a super page.

FIG. 10 is a block diagram of an example system in the form of the memory blade 103 used to retrieve a super page. These various blocks may be implemented in hardware, firmware, or software. Further, these various blocks are logically or physically connected. Illustrated is a protocol agent module 1001 to receive a memory request encoded with a protocol, the memory request identifying an address location in a memory module managed by a buffer. Operatively connected to the protocol agent module 1001 is a memory controller module 1002 to process the memory request to identify the buffer that manages the address location in the memory module. Operatively connected to the memory controller module 1002 is an address mapping module 1003 to process the memory request to identify at least one super page associated with the memory module, the at least one super page associated with the address location. Operatively connected to the address mapping module 1003 is an accelerator module 1004 to process the memory request, the processing including an execution of at least one of a hashing algorithm, a compression/decompression algorithm, an encryption/decryption algorithm, or an ECC coding algorithm. In some example embodiments, the accelerator module 1004 includes a CPU and memory to perform general purpose computing. In some example embodiments, the accelerator module 1004 performs special purpose computing implementing one or more of the algorithms (e.g., hashing algorithm, compression/decompression algorithm etc.). Additionally, the memory request may include at least one of a write request, a read request, an allocation request, a de-allocation request, or a permission management request. Further, the protocol may include at least one of PCIe, or HYPERTRANSPORT™. Moreover, the memory module may include at least one of DRAM, SRAM, or flash memory. In some example embodiments, the buffer includes a command queue to store the addresses and request types for the memory module, a data buffer module that comprises write data and read data used to access the memory module, and a configuration module to configure and control the memory module. The address mapping module may include a set of map registers and a RMMA map structure.

Figure 11:
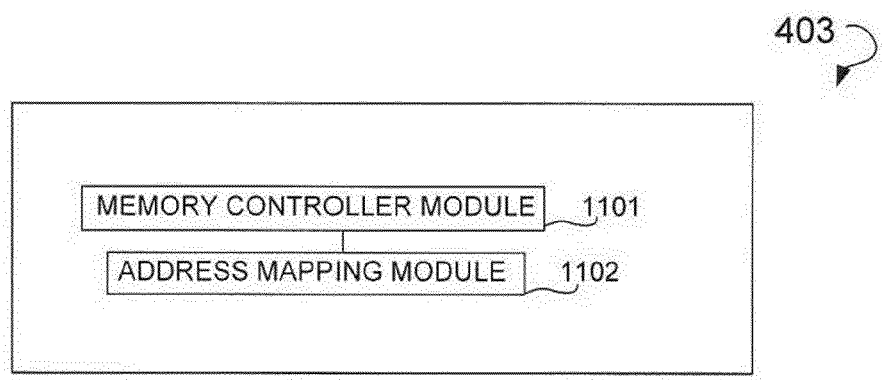
FIG. 11 is a block diagram of a system, according to an example embodiment, in the form of the memory blade.

FIG. 11 is a block diagram of an example system in the form of the memory blade 103. These various blocks may be implemented in hardware, firmware, or software. Further, these various blocks are logically or physically connected. Illustrated is a memory controller module 1101 that is executed to receive and process a memory request for a memory module, the memory information including a device identifier and a super page address. Operatively connected to the memory controller module 1101 is an address mapping module 1102 that is executed to identify at least one super page entry, the at least one super page entry identified using the device identifier and denoting at least one super page allocated for the device. In some example embodiments, the address mapping module 1102 is executed to retrieve an RMMA entry based upon the at least one super page entry and the super page address. In some example embodiments, the memory information includes at least one of an SMA, or an offset value. In some example embodiments, the address mapping module 1102 is used to combine the offset value and the RMMA super page entry to generate an RMMA. Further, the address mapping module 1102 is used to transmit the RMMA in response to the memory information. Additionally, the super page entry may include in a map register. Some example embodiments may include the address mapping module 1102 executed to access the map register using a bladeID as the device identifier. Moreover, the address mapping module 1102 may be executed to retrieve a base entry as the super page entry. In some example embodiments, the RMMA entry is included in a RMMA map structure. Further, the address mapping module 1103 may be executed to identify a permission that allows for the retrieving of the RMMA super page entry.

Figure 12:
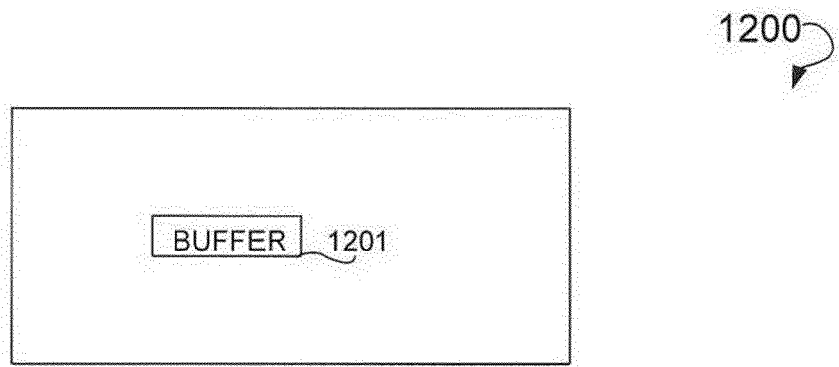
FIG. 12 is a block diagram of a system, according to an example embodiment, in the form of the memory blade used to optimize a memory module.

FIG. 12 is a block diagram of an example system in the form of the memory blade 103 used to optimize a memory module. These various blocks may be implemented in hardware, firmware, or software. Further, these various blocks are logically or physically connected. Illustrated is a buffer 1201 that receives a memory command that identifies at least one super page included in a memory module managed by the buffer. The buffer 409 is an example of the buffer 1201. Further, the buffer 1201 is used to identify optimization characteristics based upon the memory command, the optimization characteristics to be applied to the memory module. The memory module 405 is an example of the memory module referenced above. In some example embodiments, the memory command includes at least one of a write command, or a read command. Additionally, in some example embodiments, the optimization characteristic includes at least one of a power up of the memory module, or a power down of the memory module. Additionally, in some example embodiments, the buffer 1201 implemented certain optimization characteristics through grouping memory locations in the memory module into Error Correction Coding (ECC) groupings. Moreover, the buffer 1201 is executed to set ECC bits on the memory module at a cache block granularity. In some example embodiments, the buffer 1201 is executed to write data to the at least one super page included in the memory module managed by the buffer 1201. Further, the buffer 1201 may be used to write the data, using the buffer, to another super page included in another memory module managed by the buffer. Some example embodiments include the buffer 1201 being executed to implement an optimization characteristic that includes managing a further buffer with the buffer 1201, the managing including transmitting the memory command to the further buffer. An example of the further buffer would be the buffer 304 that is managed by the buffer 302.

Figure 13:
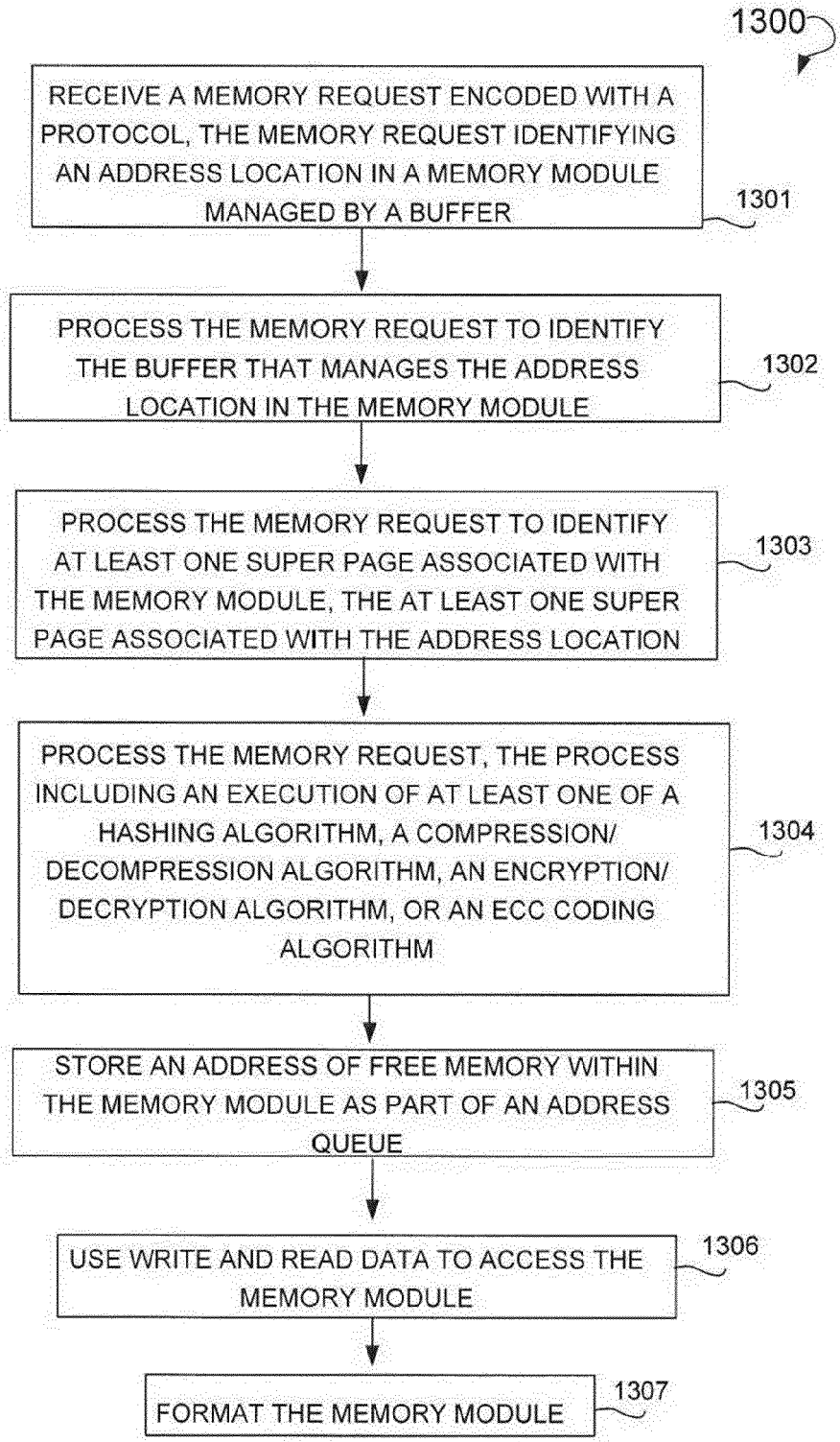
FIG. 13 is a flow chart illustrating a method, according to an example embodiment, to retrieve a super page.

FIG. 13 is a flow chart illustrating an example method 1300 to retrieve a super page. Illustrated is an operation 1301 that is executed by the protocol agent module 1001 to receive a memory request encoded with a protocol, the memory request identifying an address location in a memory module managed by a buffer. An operation 1302 is shown that is executed by the memory controller module 1002 to process the memory request to identify the buffer that manages the address location in the memory module. An operation 1303 is illustrated that is executed by the address mapping module 1003 to process the memory request to identify at least one super page associated with the memory module, the at least one super page associated with the address location. Operation 1304 is illustrated that is executed by the accelerator module 1004 to process the memory request, the processing including an execution of at least one of a hashing algorithm, a compression/decompression algorithm, an encryption/decryption algorithm, or an ECC coding algorithm. In some example embodiments, the memory request may include at least one of a write request, a read request, an allocation request, a de-allocation request, or a permission management request. In some cases, the protocol includes at least one of PCIe, or HYPERTRANSPORT™. Some example embodiments include the memory module includes at least one of DRAM, SRAM, or flash memory. Additionally, an operation 1305 is executed by the buffer (e.g., buffer 409) to store an address of free memory within the memory module as part of an address queue. An operation 1306 is executed by the buffer to use write and read data to access the memory module. An operation 1307 is executed by a configuration module (e.g., configuration module 501) to format the memory module. In some example embodiments, the address mapping module includes a map register and an RMMA map structure.

Figure 14:
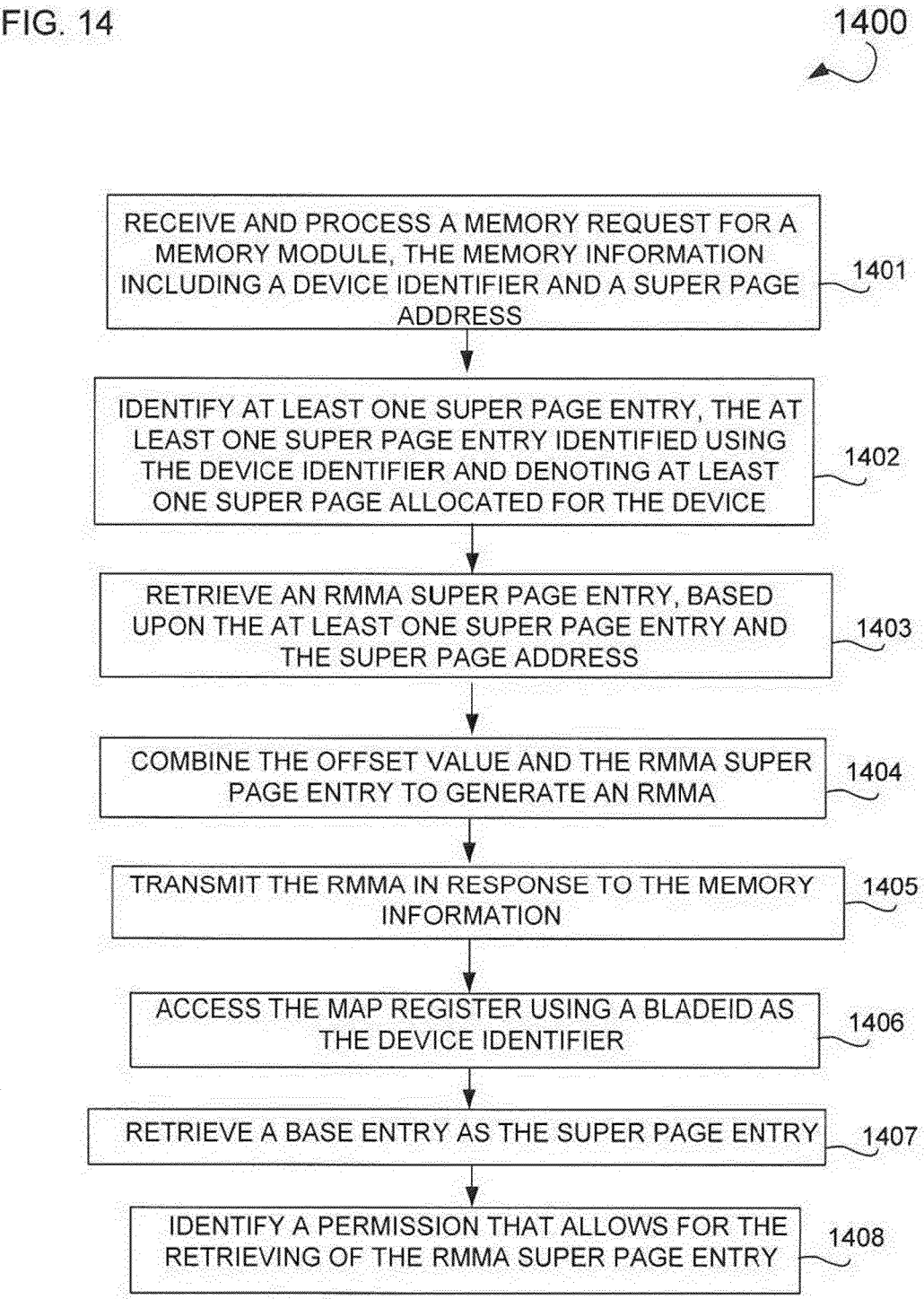
FIG. 14 is a flow chart illustrating a method, according to an example embodiment, executed on a memory blade.

FIG. 14 is a flow chart illustrating an example method 1400 executed on a memory blade 103. An operation 1401 is executed by the memory controller module 1101 to receive and process a memory request for a memory module, the memory information including a device identifier and a compute blade machine address. An operation 1402 is executed by the address mapping module 1102 to identify at least one super page entry, the at least one super page entry identified using the device identifier and denoting at least one super page allocated for the device. An operation 1403 is executed by the address mapping module 1102 to retrieve an RMMA entry, based upon the at least one super page entry and the super page address. In some example embodiments, the memory information includes at least one of a SMA, or an offset value. An operation 1404 is executed by the address mapping module 1102 to combine the offset value and the RMMA entry to generate an RMMA. An operation 1405 is executed by the address mapping module 1102 to transmit the RMMA in response to the memory information. In some example embodiments, the super page entry is included in a map register. An operation 1406 is executed by the address mapping module 1102 to access the map register using a bladeID as the device identifier. An operation 1407 is executed by the address mapping module 1102 to retrieve a base entry as the super page entry. In some example embodiments, the RMMA entry is included in a RMMA map structure. Operation 1408 is executed by the address mapping module 1102 to identify a permission that allows for the retrieving of the data.

Figure 15:
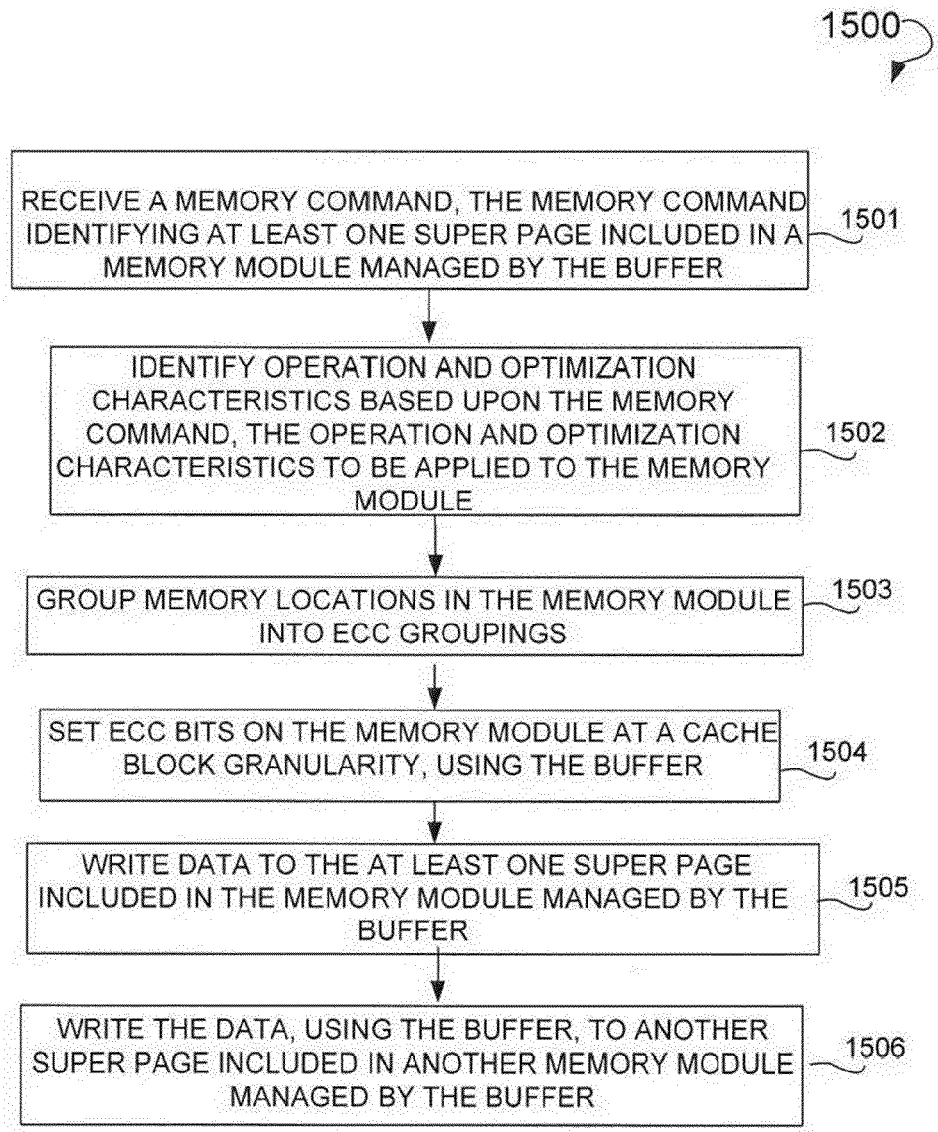
FIG. 15 is a flow chart illustrating the execution of a method, according to an example embodiment, to optimize a memory module.

FIG. 15 is a flow chart illustrating the execution of an example method 1500 to optimize a memory module. An operation 1501 is executed by a buffer 1201 to receive a memory command, the memory command identifying at least one super page included in a memory module managed by the buffer. An operation 1502 is executed by a buffer 1201 to identify operation and optimization characteristics based upon the memory command, the operation and optimization characteristics to be applied to the memory module. In some example embodiments, the memory command includes at least one of a write command, or a read command. In some example embodiments, the operation and optimization characteristic includes at least one of a power up of the memory module, or a power down of the memory module. An operation 1503 is executed by the buffer 1201 to group memory locations in the memory module into ECC groupings. Operation 1504 is executed by the buffer 1201 to set ECC bits on the memory module at a cache block granularity, using the buffer. Operation 1505 is executed by the buffer 1201 to write data to the at least one super page included in the memory module managed by the buffer. Operation 1506 is executed by the buffer 1201 to write the data, using the buffer, to another super page included in another memory module managed by the buffer. In some example embodiments, the operation and optimization characteristics include managing a further buffer with the buffer, the managing including transmitting the memory command to the further buffer. The configuration module 501 may be used to execute the various operations 1501 through 1506.

Figure 16:
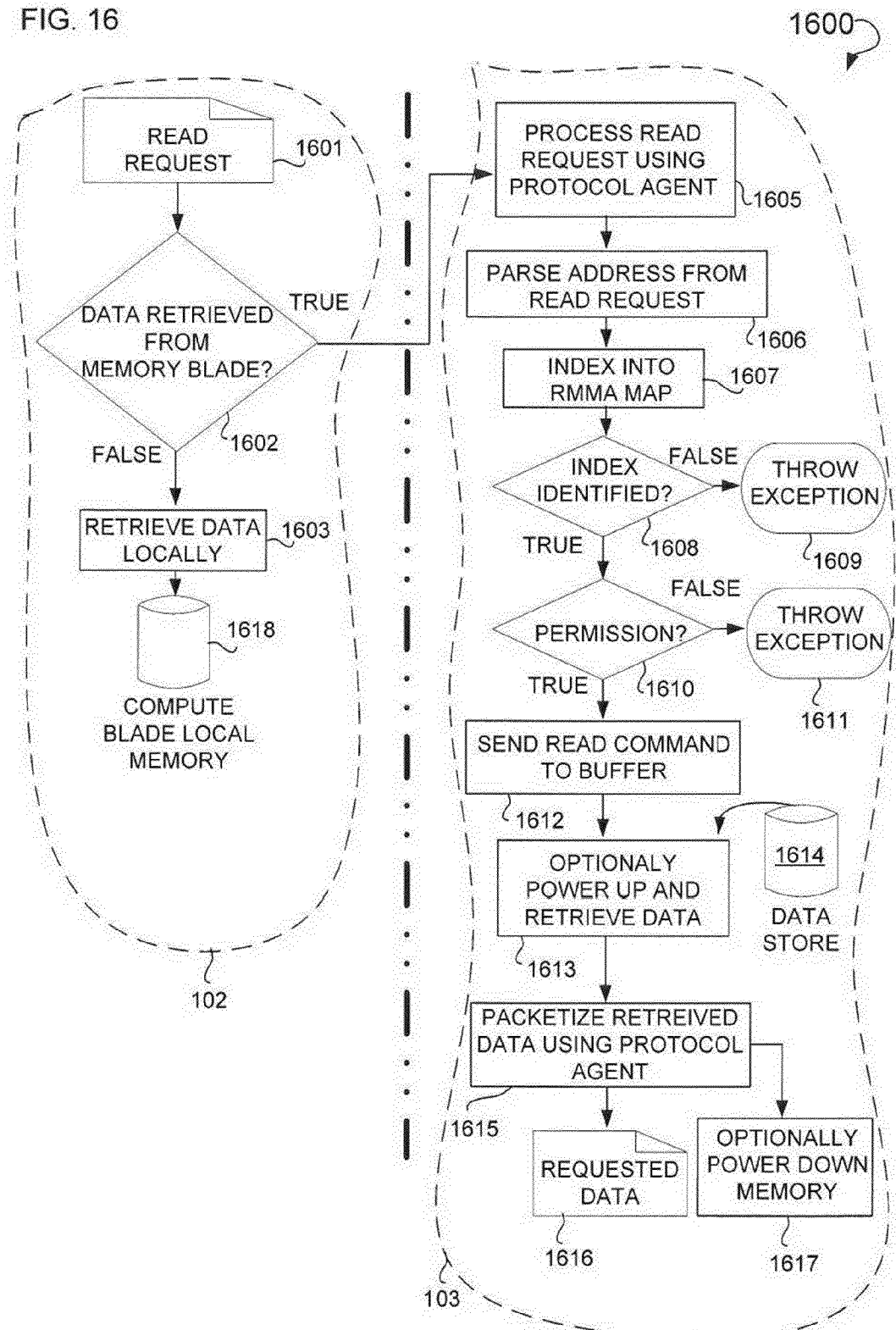
FIG. 16 is a dual-stream flow chart illustrating a method, according to an example embodiment, used to process a read requests.

FIG. 16 is a dual-stream flow chart illustrating an example method 1600 used to process a read requests. Shown are various operations 1602 through 1603 that are executed by the computer blade 102. Also shown is a computer blade local memory 1618 that also resides upon the computer blade 102. Further, shown are operations 1605 through 1617 that are executed by the memory blade 103. Included as part of these operations are throw exceptions 1609 and 1611, requested data 1616, and data store 1614. Operations 1606 through 1612 may be executed by the memory controller 402. In one example case, a read request 1601 is received by the computer blade 102. A decisional operation 1602 is executed to determine whether the data sought in the read request 1601 is stored on the computer blade 102. In cases where decisional operation 1602 evaluates to "false" an operation 1603 is executed retrieve data locally from the compute blade 102. The data sought in the read request 1601 is retrieved from the compute blade local memory 1618. This local memory 1618 may be Level 2 (L2) cache memory or main memory.

In example cases where decisional operation 1602 evaluates to "true," an operation 1605 is executed. Operation 1605 is executed to processes the read request 1601 using the protocol agent 401. An operation 1606 is executed to parse the address of the data from the read request 1601. Specifically, the read request 1601 is unpacked, or parsed, and separated from its protocol header. For example, a SMA may be parsed to retrieve a super page address through the use of operation 1606. Operation 1607 is executed to index into the RMMA map table 802 (see e.g., operation 904 referenced above). A decisional operation 1608 is executed to determine whether an index within the RMMA map table 802 has been identified. In cases where decisional operation 1608 evaluates to "false," an exception 609 is thrown. This exception 609 may be handled by the hypervisor 202. In cases where decisional operation 1608 evaluates to "true," a decisional operation 1610 is executed. Decisional operation 1610, when executed, determines whether the appropriate permissions exist to access a particular RMMA map table entry. In cases where decisional operation 1610 evaluates to "false," an exception is thrown as denoted at 1611. Exceptions thrown at 1611 are handled by the hypervisor 202. In example cases where decisional operation 1610 evaluates to "true," an operation 1612 is executed. Operation 1612 transmits or otherwise sends a read command to a buffer (see e.g., buffer 409). Operation 1613 is executed to optionally power up and retrieve decoded data from memory such as DRAM 601 or DRAM 602. This memory is represented generically as data store 1614. Operation 1615 is executed to packetized data using the protocol agent 401. This packetization process includes affixing a header to the decoded data such that the decoded data can be transmitted across a memory channel such as memory channel 605 or 606. This data is transmitted as a response message in the form of requested data 1616. Operation 1617 is executed to optionally power down memory in the form of, for example, DRAM 601 or 602. In some example embodiments, in parallel with the read, the ECC and dirty bits are fetched and packetized with the data as part of the response message for the read request 1601.

In some example embodiments, one or more optimizations of the memory blade 103 are implemented. For example, where data is to be read or written locally to the compute blade 102, power optimization is facilitated through putting the DRAM 601 on the memory blade 103 into an active power-down mode. A second example of power optimization is facilitated through placing data within consecutive virtual memory pages on the same DRAM 601 residing on the memory blade 103. As to the first example of power optimization, a powering down of the DRAM 601 may occur whenever the idle period of the DRAM 601 has been longer than a given threshold, and the buffer (e.g., buffer 409) can command the DRAM into active power-down mode. The buffer 409 may receive a power down command from the compute blade 102 via another buffer or the memory controller 402 via a memory channel. A given threshold may be some unit of time. With respect to the second example of power optimization, virtual memory pages are clustered to a reduced number of DRAM such that a fewer number of DRAM is utilized than would otherwise be used to store data. As illustrated above, DRAM not in use is powered down.

Figure 17:
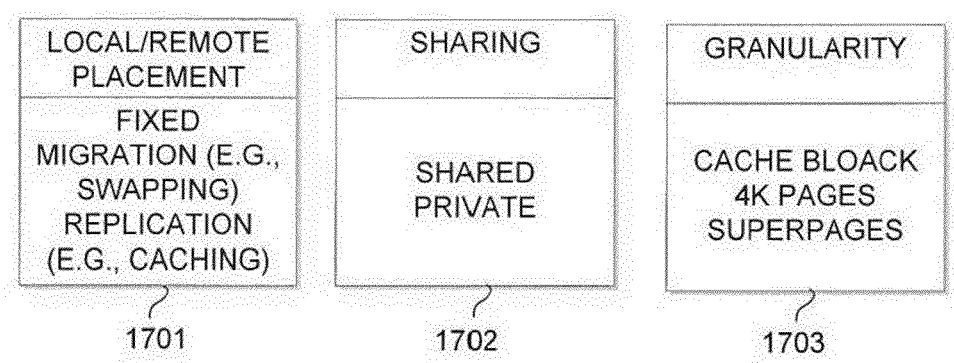
FIG. 17 is a diagram of various memory blade data use model, according to an example embodiment.

FIG. 17 is a diagram of various example memory blade data use models 1700. A data use model 1701 is shown titled "Local/Remote Placement." In some example embodiments, when a compute blade accesses a piece of data on the memory blade, the local/remote placement data use model determines whether the data is kept on the memory blade or whether a local copy of the data is to be kept. Included as part of this data use model 1701 are the concepts of fixed migration of local and remote virtual memory pages, referenced herein as swapping. Also included as part of the data use model 1701 is the concept of replication, where data is cached in multiple memory locations. Further, a data use model 1702 is illustrated titled "Sharing." In some example embodiments, data on the remote blade can either be shared among multiple compute blades or private to a single compute blade. The memory blade may need to encode with a sharing permission, and enforce this permission. A data use model 1703 is shown that is titled "Granularity." This data use model 1703 is used to dictate the size by which memory is divided. For example, the accessed data size may be a cache block, a 4 KB page, or a super page of 16 KB. In some example embodiments, the memory blade is provided intelligence regarding the access data size.

In some example embodiments, an API is provided for the memory blade 103 so as to allow compute blades and other devices to interface with the memory blade. This API may be exposed by the central memory controller 301 to a compute blade. These APIs provide an interface to utilize the data use modules referenced above. Illustrated are various data access functions. These data access functions include—
data=read (bladeID, bladeMA, size)
write (bladeID, bladeMA, size, data)
The read function takes three parameters that include a blade identifier (bladeID) value, a blade machine address (bladeMA) value, and a size value. A page of virtual memory is returned through the execution of this function as data. The bladeID identifies a particular memory blade from which data is being retrieved. Additionally, the bladeMA value is a logical or physical address for a memory blade. The size value reflects the size of the virtual memory page being retrieved for reading. These various parameters may be integers or some other suitable value. Additionally, as illustrated above, the write function takes the three aforementioned parameters plus a data parameter that may denote the data type of the data being written to memory.

In some example embodiments, the above referenced API includes various capacity management functions that include—
allocate (bladeID, bladeMA, size)
release (bladeID, bladeMA, size)
The capacity management functions allow for a compute blade to request that memory be allocated or de-allocated (e.g., released) on the memory blade 103. Like the read function illustrated above, both of the capacity management functions take, for example, three parameters (e.g., bladeID, bladeMA, and size). These parameters, however, are used for a purpose distinct from that outlined above with respect to the data access functions. Here, for example, these three parameters are used to identify a particular blade upon which memory is to be allocated. Additionally, the size of the virtual pages to be allocated is also provided.

Some example embodiments of the above referenced API include a mapping and sharing API. The mapping and sharing API has the following form:
RMMA=getMap (bladeID, bladeMA)
setMap (bladeID, bladeMA, RMMA, permission)
The getmap function takes two parameters, and returns an integer in the form of a Remote Memory Machine Address (RMMA). These two parameters are the aforementioned bladeID, and bladeMA. The setMap function takes four parameters that include bladeID and bladeMA, RMMA, and a permission value. The permission value may be a boolean value, integer value, character value, or other suitable values used to denote a particular permission field in the RMMA map table 702.

In some example embodiments, a VM is migrated from one compute blade to another compute blade such that the memory contents of the migrated compute blade needs to be copied. In cases where address mapping is implemented (see e.g., RMMA Map 802) on a memory blade, only local memory for the VM need be migrated through the use of the above referenced setMap function.

Figure 18:
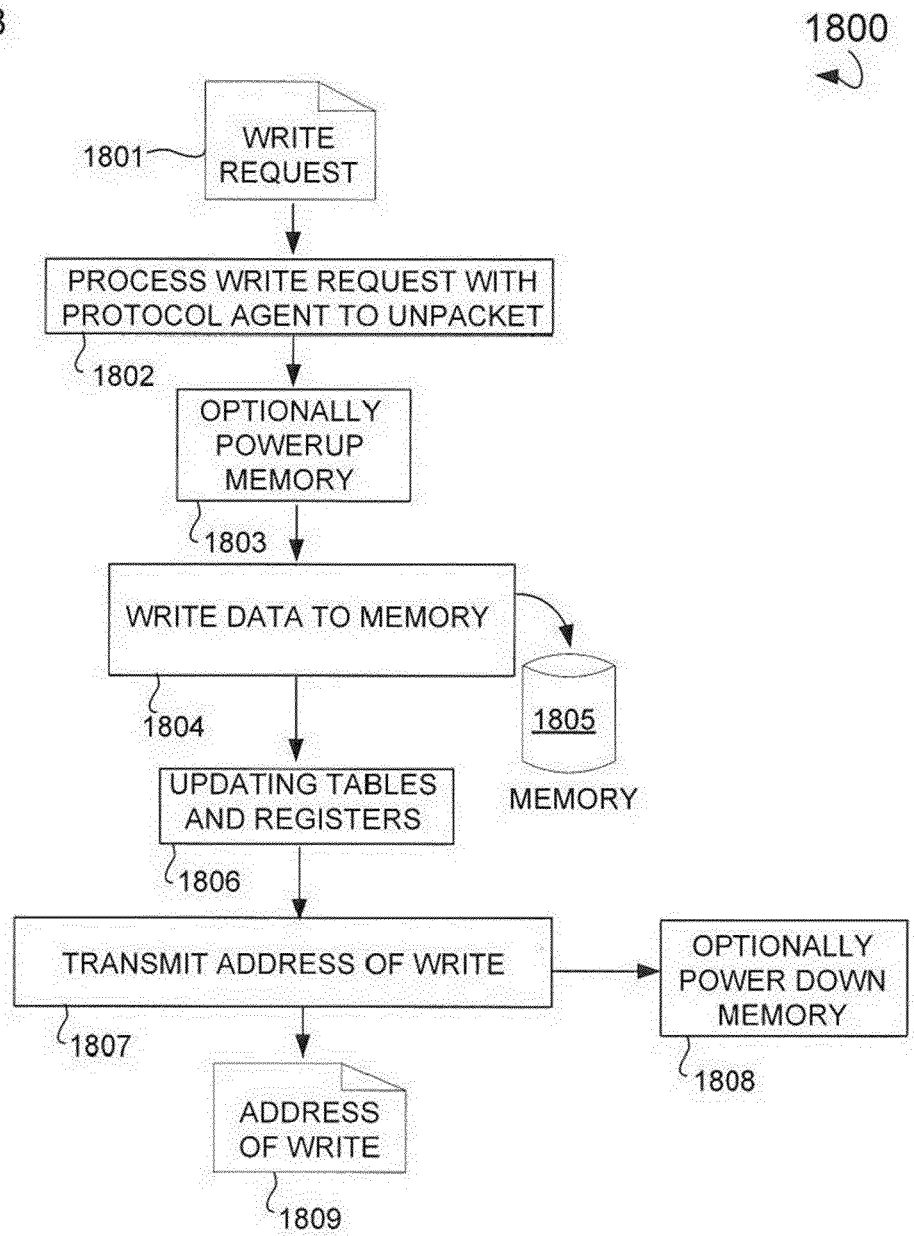
FIG. 18 is a flowchart illustrating the execution of a method, according to an example embodiment, used to write memory to a particular memory location on the memory blade.

FIG. 18 is a flowchart illustrating the execution of an example method 1800 used to write memory to a particular memory location on the memory blade 103. Illustrated are various operations 1802 through 1808 that are executed on the memory blade 103. In one example case, a write request 1801 is received by the memory blade 103. This write request 1801 is processed through the execution of operation 1802. Operation 1802 is executed by the protocol agent 401 to parse and unpacked the write request 1801. Operation 1803 is executed to optionally power up memory in the form of DRAM 601 and DRAM 602 represented generically as memory 1805. In some example embodiments, operation 1803 is executed after retrieving the RMMA address and confirming the operation permissions. Operation 1804 is executed to write data to memory 1805. Operation 1806 is executed to updates tables and registries associated with tracking or mapping the newly written data. Tables and registries include, for example, a page table, a Table Lookaside Buffer (TLB), or other suitable table or register. An operation 1807 is executed to transmit an address of write 1809, where the address is the address of the write in memory (see e.g., DIMM write data 504). Operation 1808 is executed to optionally power down memory in the form of the DRAM 601 or DRAM 602.

In some example embodiments, the operation 1806 is executed to facilitate ECC coding and capacity optimizations on the buffers 409 and 410. The buffers can encode the ECC bits on groups of cache block granularity (e.g., 64 bytes), as compared to typical 8-byte granularity, reducing ECC overhead due to encoding 12 bits per 64 bytes. This generates a resulting cost savings when ECC is performed.

In some example embodiments, prior to or while executing the method 1800 various memory allocation and de-allocation operations are performed by the central memory controller 401. These allocations and de-allocations may be executed by the operation 1806 prior to the writing of data. In one example embodiment, the memory blade 103 maintains a list of free virtual super pages to track capacity for allocation and de-allocation. In cases where the virtual free pages runs low in the memory blade 103, the memory blade 103 coordinates with the hypervisors (e.g., hypervisor 202) on individual compute blades (e.g., compute blades 101 and 102) to inflate one or more VM memory balloon drivers (e.g., balloon driver 207). The inflating of the VM memory balloon drivers frees pages in the VM address space for use by another compute blade.

Figure 19:
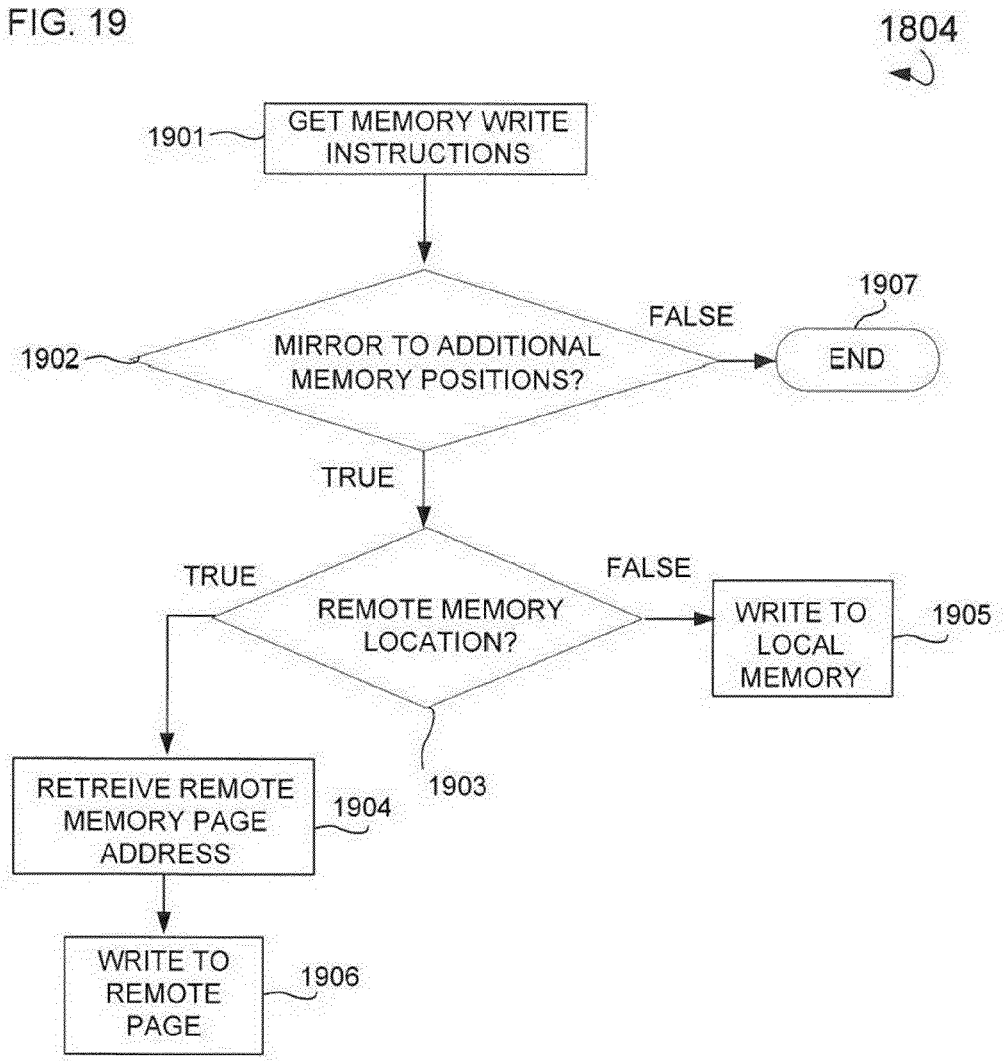
FIG. 19 is a flow chart illustrating the execution of a method, according to an example embodiment.

FIG. 19 is a flow chart illustrating the execution of an example method 1804. Shown are operations 1901 through 1906 executed in the writing of memory. An operation 1901 is executed to get a memory write instruction for a particular type of memory module (e.g., DRAM 601 or flash 603). A decisional operation 1902 is executed to determine whether the data to be written to memory is to be mirrored to additional memory positions on additional memory modules. In example cases where the decisional operation 1902 evaluates to "false" a termination condition 1907 executes. In cases where decisional operation 1902 evaluates to "true," a further decisional operation 1903 is executed. Decisional operation 1903 determines whether a memory location is remote. In cases where decisional operation 1903 evaluates to "false," an operation 1905 is executed that write data to local memory. In cases where decisional operation 1903 evaluates to "true" an operation 1904 is executed. Operation 1904 is executed to retrieve remote memory page addresses. Operation 1906 is executed to write data to a remote memory page.

Figure 20:
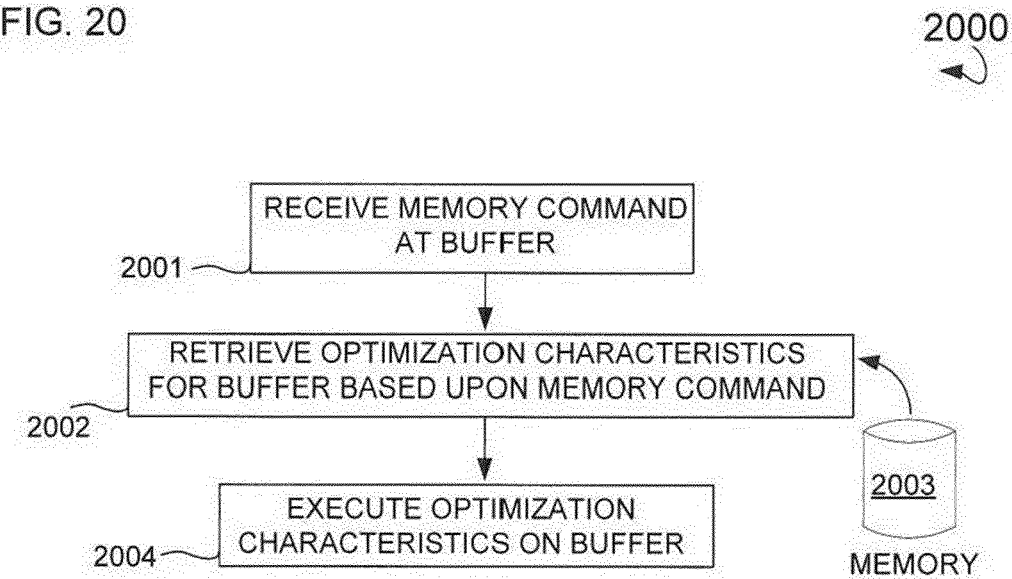
FIG. 20 is a flow chart illustrating a method, according to an example embodiment, used to apply an optimization characteristic to a buffer.

FIG. 20 is a flow chart illustrating an example method 2000 used to apply an optimization characteristic to a buffer. Shown are various operations 2001 through 2004 that include a memory 2003. These various operations are executed, for example, by the memory controller 402. Operation 2001 is executed to receive a memory command at a buffer. Operation 2002 is executed to retrieve operation and optimization characteristics for a buffer based upon a memory command. These operation and optimization characteristics may be retrieved from a memory 2003. These operation and optimization characteristics may include power optimizations, ECC coding optimizations, or other suitable optimizations. Operation 2004 is executed to apply the operation and optimization characteristics to a buffer.

Figure 21:
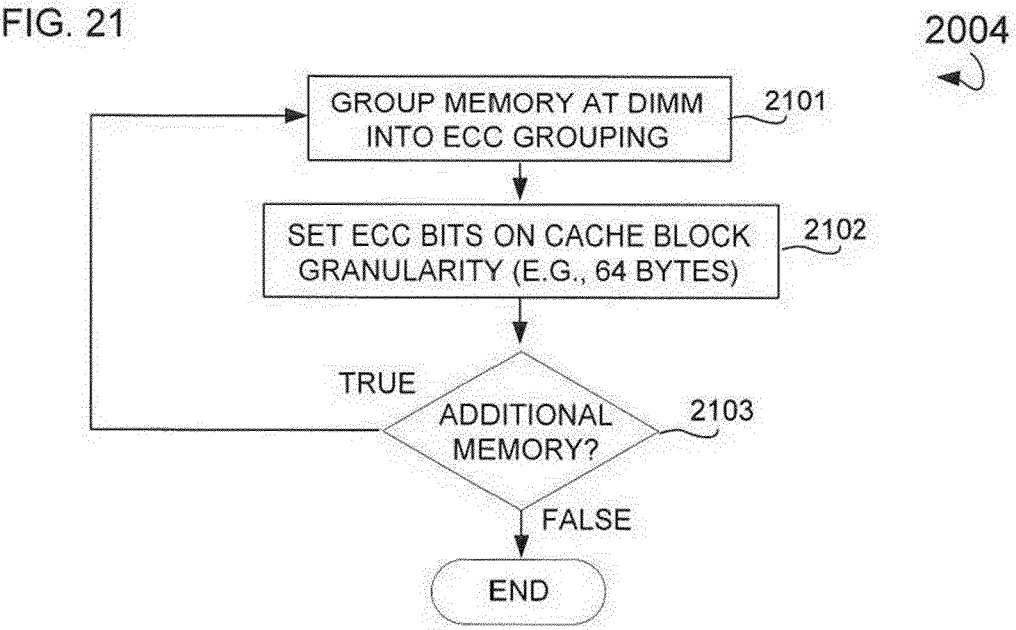
FIG. 21 is a flow chart illustrating the execution of a method, according to an example embodiment, executed to apply the operation and optimization characteristics to a buffer.

FIG. 21 is a flow chart illustrating the execution of an example method 2004. Shown are operations 2101 through 2103. Operation 2101 is executed to group memory into a DIMM using an ECC grouping granularity. Operation 2102 is executed to set ECC bits on a cache block granularity. A decisional operation 2103 is executed that determines whether additional memory is to be grouped. In cases where decisional operation 2103 evaluates to "true," the operation 2101 is re-executed. In cases where decisional operation 2103 evaluates to "false," the method is terminated.

FIG. 22 is a diagram of an example computer system 2200. Shown is a CPU 2201. The processor die 201 may be a CPU 2201. In some example embodiments, a plurality of CPU may be implemented on the computer system 2200 in the form of a plurality of core (e.g., a multi-core computer system), or in some other suitable configuration. Some example CPUs include the x86 series CPU. Operatively connected to the CPU 2201 is Static Random Access Memory (SRAM) 2202. Operatively connected includes a physical or logical connection such as, for example, a point to point connection, an optical connection, a bus connection or some other suitable connection. A North Bridge 2204 is shown, also known as a Memory Controller Hub (MCH), or an Integrated Memory Controller (IMC), that handles communication between the CPU and PCIe, Dynamic Random Access Memory (DRAM), and the South Bridge. A PCIe port 2203 is shown that provides a computer expansion port for connection to graphics cards and associated GPUs. An ethernet port 2205 is shown that is operatively connected to the North Bridge 2204. A Digital Visual Interface (DVI) port 2207 is shown that is operatively connected to the North Bridge 2204. Additionally, an analog Video Graphics Array (VGA) port 2206 is shown that is operatively connected to the North Bridge 2204. Connecting the North Bridge 2204 and the South Bridge 2211 is a point to point link 2209. In some example embodiments, the point to point link 2209 is replaced with one of the above referenced physical or logical connections. A South Bridge 2211, also known as an I/O Controller Hub (ICH) or a Platform Controller Hub (PCH), is also illustrated. Operatively connected to the South Bridge 2211 are a High Definition (HD) audio port 2208, boot RAM port 2212, PCI port 2210, Universal Serial Bus (USB) port 2213, a port for a Serial Advanced Technology Attachment (SATA) 2214, and a port for a Low Pin Count (LCP) bus 2215. Operatively connected to the South Bridge 2211 is a Super Input/Output (I/O) controller 2216 to provide an interface for low-bandwidth devices (e.g., keyboard, mouse, serial ports, parallel ports, disk controllers). Operatively connected to the Super I/O controller 2216 is a parallel port 2217, and a serial port 2218.

The SATA port 2214 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 2202 and/or within the CPU 2201 during execution thereof by the computer system 2200. The instructions may further be transmitted or received over the 10/100/1000 ethernet port 2205, USB port 2213 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer system comprising:
 a protocol agent module to receive a memory request encoded with a protocol, the memory request identifying an address location in a memory module managed by a buffer;
 a memory controller module to process the memory request to identify the buffer that manages the address location in the memory module; and
 an address mapping module to process the memory request to identify at least one super page associated with the memory module, the at least one super page associated with the address location.

2. The computer system of claim 1, further comprising an accelerator module to process the memory request, the process to include an execution of at least one of a hashing algorithm, a compression/decompression algorithm, an encryption/decryption algorithm, or an Error Correction Coding (ECC) coding algorithm.

3. The computer system of claim 1, wherein the memory request includes at least one of a write request, a read request, an allocation request, a de-allocation request, or a permission management request.

4. The computer system of claim 1, wherein the memory module includes at least one of Dynamic Random Access Memory (DRAM), Static Random Access Memory (SRAM), or flash memory.

5. The computer system of claim 1, wherein the buffer includes:
 a command queue to store the addresses and request types for the memory module;
 a data buffer module that comprises write data and read data used to access the memory module; and
 a configuration module to configure and control the memory module.

6. A computer implemented method comprising:
 receiving memory information, using a memory controller module, to process a memory request for a memory module, the memory information including a device identifier and a memory address;
 identifying at least one super page entry, using an address mapping module, the at least one super page entry identified using the device identifier and denoting at least one super page allocated for the device; and
 retrieving a Remote Memory Machine Address (RMMA) super page entry, using the address mapping module, based upon the at least one super page entry and the memory address.

7. The computer implemented method of claim 6, further comprising:
 combining the offset value and the RMMA super page entry, using the address mapping module, to generate an RMMA; and
 transmitting the RMMA in response to the memory information.

8. The computer implemented method of claim 7, wherein the super page entry includes a base entry belonging to a device, and is included in a map register.

9. The computer implemented method of claim 6, further comprising:
 accessing the map register using a blade identifier (bladeID) as the device identifier; and
 retrieving the base entry as a starting super page entry for the device.

10. The computer implemented method of claim 9, further comprising identifying a permission that allows for the retrieving of the RMMA super page entry.

11. A computer implemented method comprising:
 receiving a memory command at a buffer, the memory command identifying at least one super page included in a memory module managed by the buffer; and
 identifying an operation and optimization characteristics, using the buffer, based upon the memory command, the operation and optimization characteristics to be applied to the memory module.

12. The computer implemented method of claim 11, wherein the operation and optimization characteristics includes at least one of a power up of the memory module, or a power down of the memory module.

13. The computer implemented method of claim H, wherein the operation and optimization characteristics include:

grouping memory locations in the memory module into Error Correction Coding (ECC) groupings, using the buffer; and setting ECC bits on the memory module at a cache block granularity, using the buffer.

14. The computer implemented method of claim 11, wherein the operation and optimization characteristics include:

writing data, using the buffer, to the at least one super page included in the memory module managed by the buffer; and writing the data, using the buffer, to another super page included in another memory module managed by the buffer.

15. The computer implemented method of claim 11, wherein the operation and optimization characteristics include managing a further buffer with the buffer, the managing including transmitting the memory command to the further buffer.

* * * * *

UNITED STATES PATENT AND TRADEMARK OFFICE
CERTIFICATE OF CORRECTION

PATENT NO.         : 8,645,610 B2
APPLICATION NO.    : 13/257271
DATED              : February 4, 2014
INVENTOR(S)        : Jichuan Chang et al.

Page 1 of 1

It is certified that error appears in the above-identified patent and that said Letters Patent is hereby corrected as shown below:

In the Claims:

In column 16, line 5, in Claim 3, delete "dc-allocation" and insert -- de-allocation --, therefor.

In column 16, line 65, in Claim 13, delete "claim H," and insert -- claim 11, --, therefor.

Signed and Sealed this
Twenty-fourth Day of June, 2014

Michelle K. Lee
*Deputy Director of the United States Patent and Trademark Office*